United States Patent [19]

Kurtz et al.

[11] 4,000,864

[45] Jan. 4, 1977

[54] METHOD AND MEANS FOR WINDING PRE-CUT BAGS TO FORM ROLLS

[75] Inventors: Bernard Kurtz, Haguenau; Ermes Spizzo, Schiltigheim, both of France

[73] Assignees: Les Ateliers de Constructions Mecaniques; C. A. Holweg S.A., both of Strasbourg, France

[22] Filed: Aug. 5, 1975

[21] Appl. No.: 602,184

[30] Foreign Application Priority Data

Nov. 20, 1974 France .............................. 74.40370

[52] U.S. Cl. ................................ 242/59; 198/696; 221/277

[51] Int. Cl.$^2$ .................... B65H 75/00; B65G 15/00

[58] Field of Search .................. 242/59, 67.1 R, 64, 242/DIG. 3, 78.1; 198/180; 271/277

[56] References Cited

UNITED STATES PATENTS

| | | | |
|---|---|---|---|
| 402,551 | 4/1889 | Winn | 242/59 |
| 3,228,682 | 1/1966 | Buccicone | 198/180 X |
| 3,366,221 | 1/1968 | Preisig | 198/180 |
| 3,687,447 | 8/1972 | Mundus | 198/180 |
| 3,796,154 | 3/1974 | Weisgerber | 271/277 |
| 3,881,665 | 5/1975 | Leioux | 242/67.3 R |

*Primary Examiner*—Edward J. McCarthy
*Attorney, Agent, or Firm*—Young & Thompson

[57] ABSTRACT

The disclosure concerns the field of the making up of bags of synthetic material or other articles into rolls, and has more particularly for its object the provision of a process and an apparatus for winding such bags, previously cut to length and welded, into rolls.

9 Claims, 6 Drawing Figures

METHOD AND MEANS FOR WINDING PRE-CUT BAGS TO FORM ROLLS

The invention provides a process characterised in that it consists essentially in taking the bags one by one, at the exit from the machine, for example a welding machine, by means of a transfer conveyor device equipped with sets of grippers, in depositing each bag at retarded speed upon a belt-type or strap-type conveyor device, in retaining the thus deposited bags by suction through the belt-type conveyor and by gripping between this conveyor and a set of straps the speed of which is synchronous with that of the conveyor, and engaging the bags thus deposited and retained one upon the other in the manner of roof tiles, one by one on winding spindles having grippers.

The invention includes means for effecting the method and is applicable to bags of synthetic material commonly called "trash can bags" or "trash can liners".

INTRODUCTION AND BACKGROUND OF THE INVENTION

The present invention concerns the field of the making up of bags of synthetic material or other similar articles into rolls, and has more particularly for its object the provision of a process for winding a predetermined number of bags of synthetic material, previously cut to length and welded, into rolls.

The invention likewise has for its object the provision of a device for carrying out this process.

The currently known processes and apparatuses are based either upon the principle of bags of synthetic material welded and wound into a continuous string from a sheath of synthetic material, or upon the principle of bags made up individually, then folded and stored in cardboard boxes. In the case of bags which are welded and then wound in a string, the separation of one bag from the other on utilisation is effected by unwinding from the roll and by tearing off in the region of a perforation formed in the welding operations. These processes for making up bags in a continuous string possess drawbacks inherent in the actual principle, namely the quality of the weld and the difficulties of tearing away. In fact the preparation of welded and perforated bags in the form of a continuous strip which is then rolled necessitates a certain strip tension, in the course of the manufacturing operations, which is necessary for the conveying of the strip and the actual winding. This strip tension exerts a harmful action upon the regions where the tube is welded transversely to form the bag bottoms. However slight this strip tension may be, it exerts an elongation stress in the region of the weld where the material is softened for purposes of thermo-sealing. The welds thus obtained are weakened and it is practically impossible to obtain welds known as "retracted" which guarantee very good strength behaviour.

Another disadvantage of this process consists in that the tearing off in line with the perforation is not very convenient in fact, especially for certain types of bags either of large format or of great material thickness.

In the case of individually made up bags, the quality of the welds is good and of the "retracted" type, but the folding and storage in cardboard boxes constitutes an irksome operation from the point of view of machinery investment, especially as the operations of folding generally limit the production rates and, for large formats, the folding operations are irksome.

The present invention has the purpose of diminishing the drawbacks of the known processes and apparatuses, while retaining the practicality of bags wound into rolls, starting from individually made up bags, by virtue of a process permitting of obtaining wound rolls comprising a predetermined number of bags previously cut to length and welded by known manufacturing processes.

BRIEF SUMMARY OF THE INVENTION

The invention provides a process for winding bags of synthetic material, previously cut to length and welded, into rolls, consisting essentially in taking the bags one by one at the exit of the welding machine, by means of a transfer conveyor device equipped with sets of grippers, in depositing each bag at retarded speed upon a belt-type or strap-type conveyor device, in retaining the bags thus deposited by suction through the belt-type conveyor device and by gripping between this conveyor device and a set of straps, the speed of which is synchronous with that of the conveyor device, and engaging the bags thus disposed and retained one upon the other in the manner of roof tiles, one by one on winding spindles having grippers.

The invention also has for its object the provision of an apparatus for carrying out this process.

FURTHER DESCRIPTION AND ADVANTAGES OF THE INVENTION

In accordance with one characteristic of the invention, the apparatus for carrying out the winding process is constituted essentially by a transfer conveyor device, for example with a toothed belt, or a similar device, upon which sets of grippers are mounted in a specific number, by a belt-type or strap-type conveyor device, by a suction device disposed beneath the belt-type or strap-type conveyor device, by a set of upper straps and by winding spindles having grippers.

According to another characteristic of the invention the speed of the belt-type or strap-type conveyor device can be regulated as desired, permitting regulation of the offsetting of the bags deposited one upon the other in the manner of roof tiles by the transfer conveyor device with grippers.

In accordance with another characteristic of the invention the speed of rotation of the winding spindle is substantially higher than that of the belt-type or strap-type conveyor device, and is regulable in such a manner that the bag in the course of winding slips beneath the following bag but is still engaged beneath the latter at the moment when the latter comes beneath the winding station, the head of this bag then being taken between the bag in the course of winding and the roll already formed.

According to another characteristic of the invention the slip between the bag in the course of winding and the following bag, situated between the belt-type or strap-type conveyor device and the set of upper straps, is favoured by support rollers the position of which on the belt-type or strap-type conveyor device is regulable as a function of the format of the bags being handled, these support rollers being placed in such manner that the bag in the course of winding is free and that all other following bags are supported on the conveyor device.

In accordance with another characteristic of the invention the device for supporting the bags on the belt-type or strap-type conveyor device by regulable rollers serves more particularly to ensure continuous winding into a roll of a predetermined number of bags, by virtue of the use of several winding spindles placed on a rotary device, the setting of this device in rotation and the positioning of an empty winding spindle, set in action by a counting device on the winding of the last bag on the roll in the course of formation, involving a slip and a complete and rapid disengagement of the last bag in the course of winding, in such a manner that the fresh empty winding spindle is in position when the first bag which is to constitute the new roll is presented before it.

The invention will be better understood by virtue of the following description which relates to preferred forms of embodiment given by way of non-limitative examples, which are explained hereinafter with reference to the accompanying diagrammatic drawings.

BRIEF DESCRIPTION OF THE VIEWS IN THE DRAWINGS

DETAILED DESCRIPTION OF THE PREFERRED EMBODIMENTS

Figure 1:
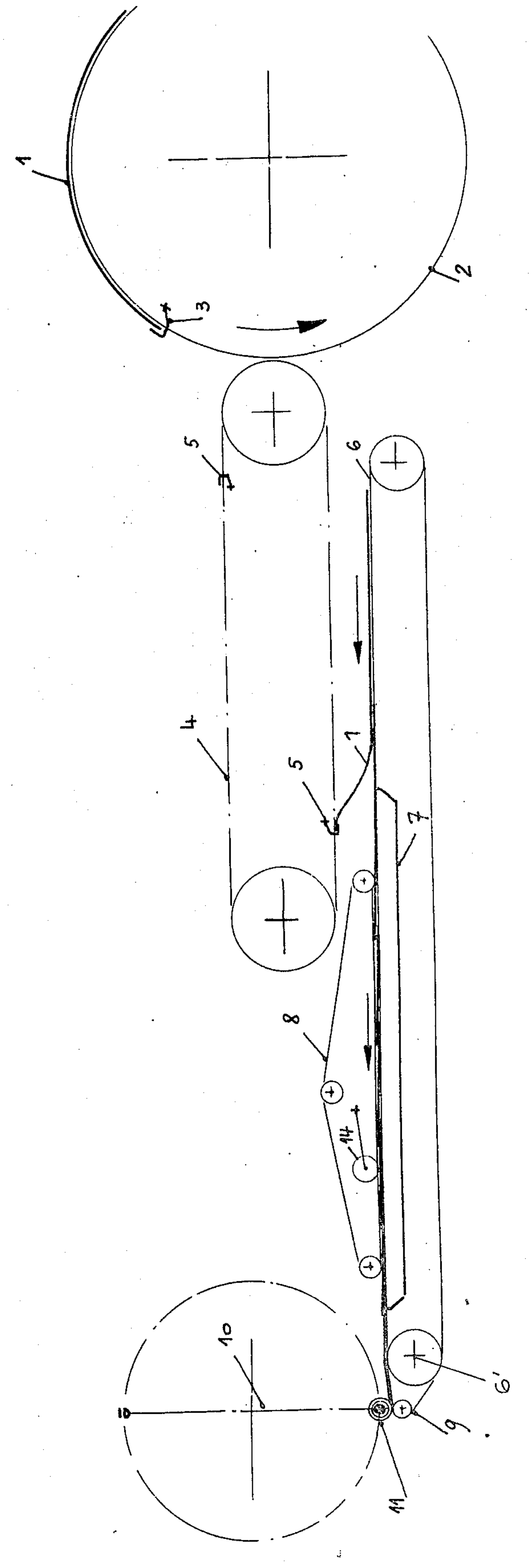
FIG. 1 is a general view of the apparatus according to the invention.

According to the invention and as shown more particularly by way of example by FIG. 1 of the accompanying drawings, the apparatus for carrying out the process for winding bags of synthetic material previously cut to length and welded into rolls is constituted essentially by a transfer conveyor device 4, by a belt-type or strap-type conveyor device 6, by a suction device 7 disposed beneath the belt-type or strap-type conveyor device 6, by a set of upper straps 8 and by winding spindles 11 with grippers 12 and 13.

The bags 1 arrive on a welding machine delivery drum 2. A specific number of grippers 3 is mounted on this drum 2, in which grippers the bags 1 are held until their passage onto the transfer conveyor device 4, for example a chain-type, toothed-belt type or the like device. This device is equipped with grippers 5 the number and relative spacing of which are such that they cooperate with the grippers 3 of the drum 2 for the transfer of the bag 1 onto the device 4. During the passage of the bag 1 from the drum 2 onto the transfer conveyor device 4, the speeds of these two elements are identical and the grippers 3 and 5 are actuated simultaneously by means of cams or the like, the gripper 3 in the opening direction and the gripper 5 in the closing direction.

The bag 1 thus taken by the corresponding gripper 5 is brought by the conveyor device 4, at a speed which is retarded progressively, onto the belt-type or strap-type conveyor device 6 and is deposited on the latter at the moment when the speed is lowest. This procedure favours correct depositing of the bags 1 upon the conveyor device 6, which brings the bags 1 to a winding station 10. The speed of the transfer conveyor device 4 is a non-uniform speed, the curve of which is sinusoidal, the highest point of this curve corresponding with the point of transfer of the bag 1 from the drum 2 to the device 4, and the lowest point corresponding to the moment of opening of the gripper 5, which is opened by means of a cam or the like, to deposit the bag 1. This continuous variation of the speed is obtained either by means of an electric speed varying device with which the drive motor of the device 4 is equipped, or by means of an elliptical pinion.

The speed of the conveyor device 6 is regulable as desired, permitting of increasing or decreasing the overlap of one bag in relation to the next according to need.

The suction device 7 placed beneath the conveyor device 6 permits of retaining the bags 1 during conveying towards the winding station 10. Moreover the set of straps 8 situated above the device 6 and circulating at the same speed as the conveyor device 6 flattens the bags against the latter and thus ensures practically slip-free conveying of the bags to the winding station 10.

The conveyor device 6 is prolonged by an auxiliary conveyor device 9 which permits accompanying of the bag 1 into the winding grippers 12 and 13 of the spindles 11. This auxiliary conveyor device 9 is mounted on the one hand beneath the winding spindle, on an elastic element, for example springs (not shown), permitting its displacement in the formation of the roll, and on the other hand by means of one or more freewheels on the spindle 6' of the device 6.

Outside the winding period the auxiliary conveyor device 9 is driven by the conveyor device 6 and rotates at the same speed as the latter, while during the winding period the auxiliary device 9 assumes the speed of the winding spindle 11, by which it is driven by friction upon the roll in formation, this speed being higher than the speed of the device 6. This procedure permits the obtaining of compact and very well formed rolls.

Figure 2:
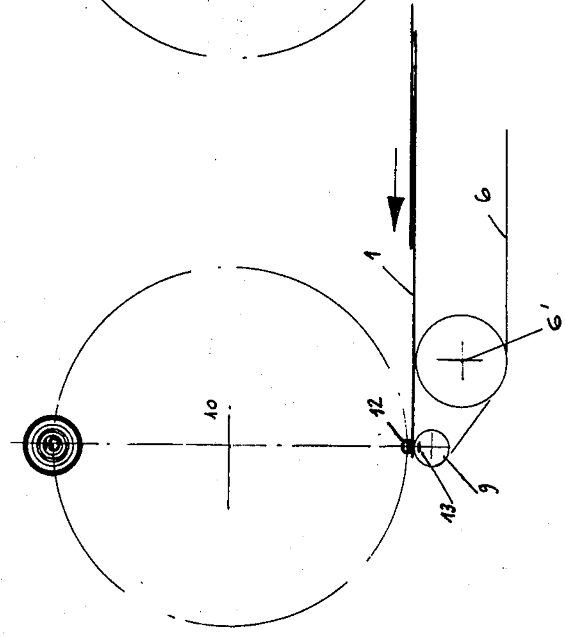
FIG. 2 is a view of the apparatus at the commencement of winding, the grippers being in the waiting position.

At the commencement of winding (FIG. 2), the winding spindle 11, composed of the grippers 12 and 13, is in the waiting position before the auxiliary conveyor device 9. The bags 1 disposed one above the other in the manner of roof tiles are brought by the conveyor devices 6 and 8. The first bag 1 is taken between the grippers 12 and 13 of the winding pindle which is then set in rotation.

Figure 4:
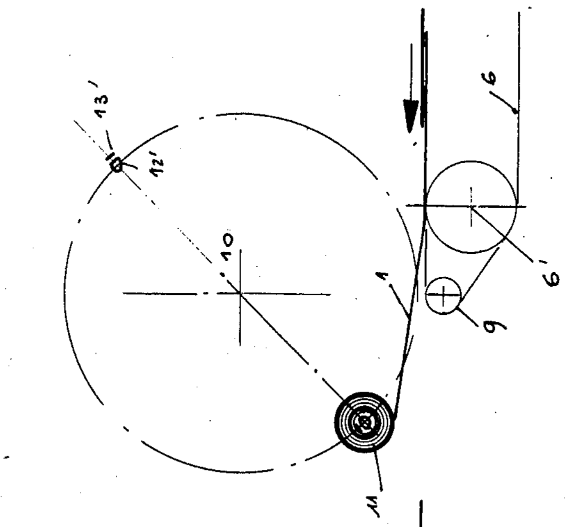
FIG. 4 is a view similar to FIG. 2, the roll being completed and the winding spindle being retracted.
Figure 3:
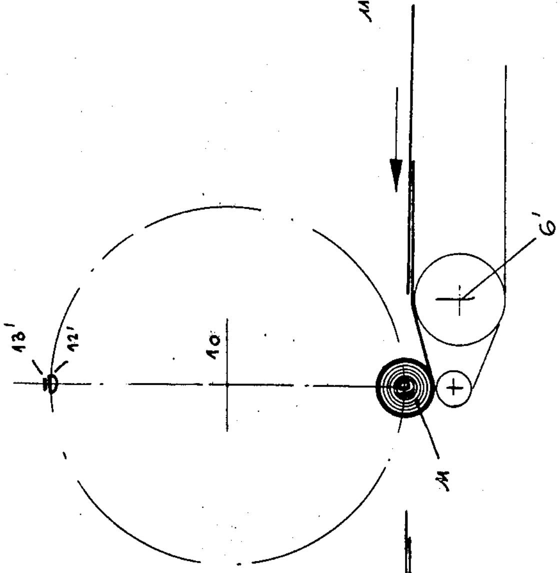
FIG. 3 is a view similar to FIG. 2, the roll being in the course of formation.

The speed of rotation of the winding spindle 11, which is appreciably higher than that of the conveyor device 6, is regulated in such a way that the bag which is wound is still beneath the following bag when the head of the latter is engaged between the rear part of the bag in the course of winding and the roll in formation, the whole resting upon the auxiliary conveyor device 9 (FIG. 3). This procedure is repeated until the last bag intended by the counting device (not shown) is engaged in the roll in formation. As soon as the winding of this last bag 1 is commenced, the counting device orders the rotation of the station 10 carrying the winding spindle which continues to rotate to complete the winding of this last bag (FIG. 4). At the end of winding the roll is released by the grippers 12 and 13 and discharged towards a reception station.

Figure 5:
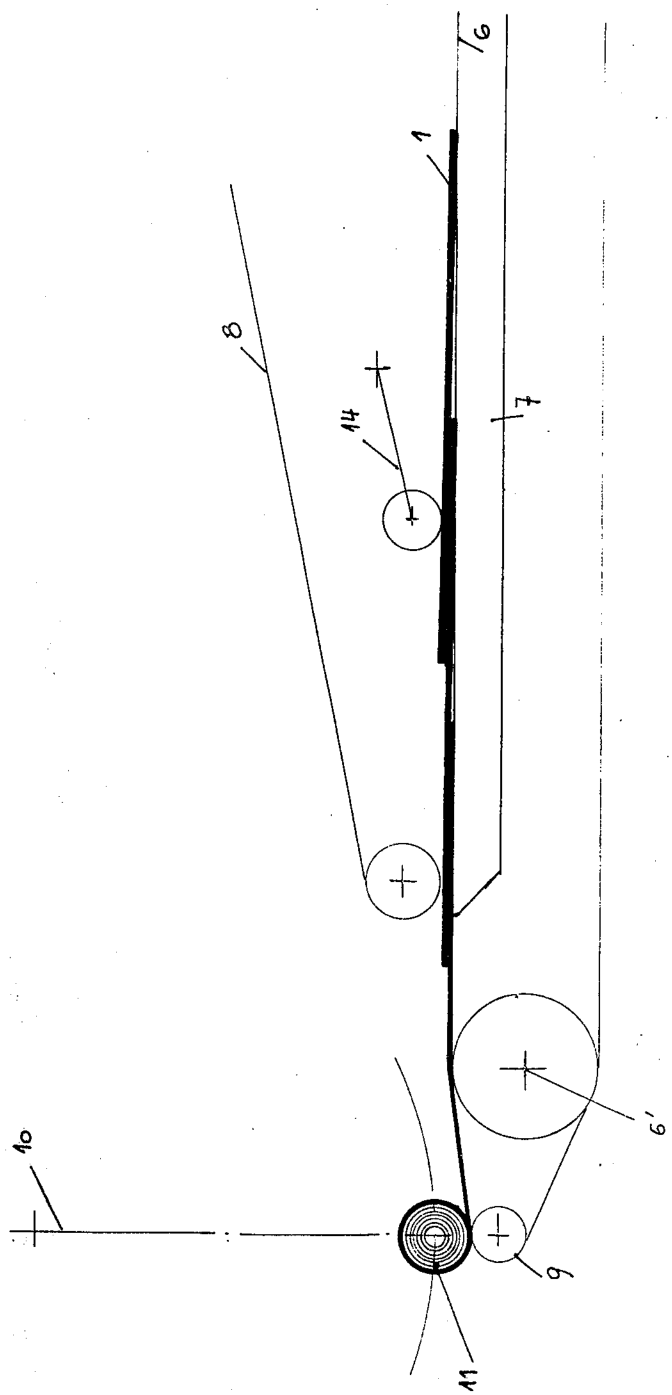
FIG. 5 shows the arrangement of the bags one upon the other in the manner of roof tiles and the device for supporting the bags.

In order to ensure correct winding, when the station 10 brings the winding spindle which is in the course of completing the roll towards the reception station of the said roll, the invention provides a support device 14 (FIGS. 1 and 5) which is constituted for example by rollers which press the bags 1 onto the device 6. This device 14 permits of avoiding dragging of the first bag intended for the new roll by that which is in the course of being wound upon the retracting spindle, the said dragging being due principally to static electricity stored in the material and the inherent weight of the bags disposed one upon the other in the manner of roof tiles. The position of this support device 14 is regulable as a function of the length of the bag to be wound, and the said device 14 is placed behind the last bag before the winding station, that is to say upon the bag following that which is in the course of being wound.

The use of two or more winding spindles disposed upon a rotary device 10 permits a fresh empty spindle to come into the waiting position in front of the conveyor device 6, the grippers 12' and 13' being ready to take the bag brought by the said conveyor device 6 for the purpose of winding.

Figure 6:
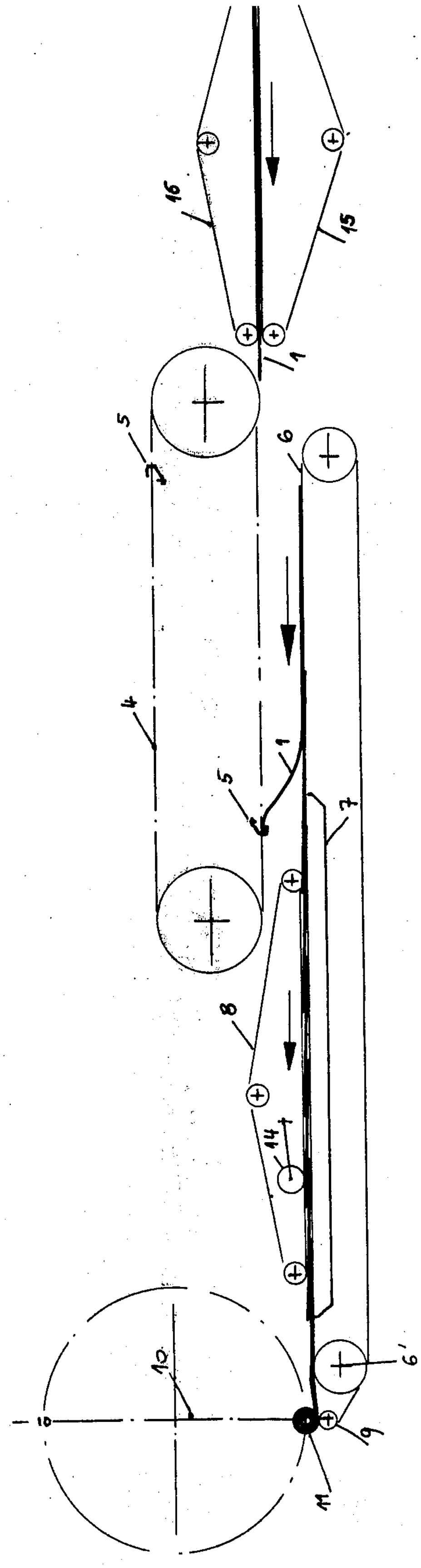
FIG. 6 represents a variant of the invention adapted to another type of welding machine.

FIG. 6 of the accompanying drawings represents a variant of the embodiment of the invention which permits of adapting the above-described apparatus to other types of welding machines, for example to a welding machine of the alternating type.

In this case the bags are transported towards the transfer conveyor device 4 between a lower set of straps 15 and an upper set of straps 16, and grasped successively by the grippers 5 of the device 4. The remainder of the apparatus is identical with that described with reference to FIGS. 1 to 5.

The invention has been described with reference to an example of application of the apparatus to a machine for welding bags of synthetic material, but it can equally be applied to the winding of bags of paper or the like.

The invention is more particularly applicable to the bags of synthetic material commonly called "trash can bags" or "trash can liners," which serve as containers in the collecting of waste of various kinds.

The invention is not of course limited to the forms of embodiment as described and represented in the accompanying drawings. Modifications remain possible, especially from the point of view of the constitution of the various elements, without thereby departing from the scope of protection of the invention.

What is claimed is:

1. A process for winding bags previously cut to length, into rolls, comprising depositing each bag on an endless conveyor in partially overlapping relation with a bag previously deposited on said endless conveyor, passing the thus-formed series of partially overlapping bags on said endless conveyor between said endless conveyor and a superposed endless conveyor that moves at the same speed as the first-mentioned endless conveyor, gripping the forward edge of the foremost bag with a winding spindle in a winding station, rotating said winding spindle to roll up on said spindle a series of partially overlapping bags, and moving said winding spindle from said winding station thereby to separate the wound up bags from the next bags in said series of overlapping bags.

2. A process as claimed in claim 1, and retaining said series of bags on the first-mentioned endless conveyor by suction through said first-mentioned endless conveyor.

3. A process as claimed in claim 1, and depositing said bags on said first-mentioned endless conveyor by means of a transfer conveyor that moves said bags first at relatively high speed and then at relatively low speed when depositing said bags in overlapping relationship on said first-mentioned endless conveyor.

4. Apparatus for winding bags previously cut to lengths, into rolls, comprising endless conveyor means for receiving said bags on an upper run thereof, means to deposit said bags on said endless conveyor in partially overlapping relationship, spindle means for winding the first of a series of said overlapping bags into a roll with the bags in the roll partially overlapping each other in a winding station, and means for moving said spindle means out of said winding station thereby to separate the last bag in the roll from the next bag in said series of bags.

5. Apparatus as claimed in claim 4, and means to retard said next bag on said endless conveyor means thereby to facilitate separation of said last bag in said roll from said next bag.

6. Apparatus as claimed in claim 4, and an endless conveyor superposed above said first-mentioned endless conveyor, said series of overlapping bags passing beneath said superposed endless conveyor.

7. Apparatus as claimed in claim 4, said depositing means comprising a transfer conveyor with gripper means thereon that grips the forward edges of said bags and moves said bags first at a relatively high speed and then at a relatively low speed as the bags are deposited on top of each other in partially overlapping relationship.

8. Apparatus as claimed in claim 4, and suction means disposed beneath said endless conveyor for retaining said bags on said endless conveyor.

9. Apparatus as claimed in claim 4, said spindle moving means comprising rotary conveyor means having a plurality of spindles on its periphery and mounted for rotation about a horizontal axis.

* * * * *